United States Patent [19]

Shimizu

[11] Patent Number: 4,476,278

[45] Date of Patent: Oct. 9, 1984

[54] DUSTPROOF FILM FORMING MATERIAL

[75] Inventor: Chiyuki Shimizu, Ota, Japan

[73] Assignee: Toshiba Silicone Co., Ltd., Tokyo, Japan

[21] Appl. No.: 568,473

[22] Filed: Jan. 5, 1984

[51] Int. Cl.³ .......................... C09D 3/66; C09D 3/82
[52] U.S. Cl. ..................................... 524/588; 428/447
[58] Field of Search ........................ 524/588; 428/447

[56] References Cited

U.S. PATENT DOCUMENTS

| | | | |
|---|---|---|---|
| 4,257,932 | 3/1981 | Beers | 524/588 |
| 4,287,109 | 9/1981 | Schlak et al. | 524/588 |
| 4,368,235 | 1/1983 | Vaughn | 428/447 |
| 4,377,676 | 3/1983 | Gauthier et al. | 524/588 |
| 4,395,462 | 7/1983 | Polmanteer | 428/447 |
| 4,433,007 | 2/1984 | Marwitz et al. | 428/447 |
| 4,436,856 | 3/1984 | Huhn et al. | 428/447 |

OTHER PUBLICATIONS

Chemical Abstracts, vol. 98, No. 16, Apr. 18, 1983, p. 85, Abstract 98:127817a.

Primary Examiner—Ronald W. Griffin
Attorney, Agent, or Firm—Gary L. Loser

[57] ABSTRACT

A composition curable to a dustproof film comprising:
(A) 100 parts by weight of an alkyd resin,
(B) 5 to 200 parts by weight of methyltrimethoxysilane,
(C) a curing catalyst; and
(D) 50 to 5000 parts by weight of a solvent mixture consisting of
  (a) a volatile organosilicon compound which has a boiling point of 70° to 250° C. at atmospheric pressure and has a formula selected from the group consisting of

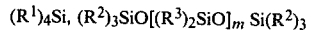

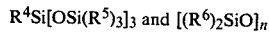

wherein $R^1$ to $R^6$ respectively represent the same or different alkyl groups, m represents 0 or a positive integer and n represents a positive integer of 3 or above, and
  (b) a hydrocarbon solvent substantially free of methanol, wherein the amount of (a) is 5 to 95 wt. % of the total amount of (a) and (b).

5 Claims, No Drawings

DUSTPROOF FILM FORMING MATERIAL

BACKGROUND OF THE INVENTION

This invention relates to a dustproof film forming material, and more particularly it relates to a room temperature curable film forming material which can form an excellent dustproof film on the surface of a silicone elastomer.

There are various known polyorganosiloxane compositions which cure at room temperature to thereby afford an elastomer. For example, compositions prepared from polydiorganosiloxane blocked with silanol groups at both ends and an organosilicon compound which has a hydrolyzable group bonded to the silicon atom, such as acetoxy, alkoxy, dialkylketoxime, dialkylamino, dialkylaminoxy, or N-methylamido group as a crosslinking agent, have been widely used in the construction, automotive and electrical fields and the like.

These compositions are generally called "silicone sealants" and are widely used to waterproof joints of concrete or aluminum wall board, to fix a glass plate to a sash, or to bond two glass plates together in the construction industry. Demand for these silicone sealants is greatly increasing for use on high rise buildings or the like because they exhibit excellent weatherability, durability, high- and low-temperature resistance, the physical properties are scarcely altered by temperature change, there is no deterioration by ozone or ultraviolet rays, and the sealants exhibit high workability. In addition, recently some attempts have been made at utilizing them as a coating material by applying such a crosslinkable polyorganosiloxane on a roof or wall to thereby form a silicone elastomer layer having an excellent waterproofness and weatherability.

Although these silicone elastomers have the advantages described above, they are dust attracting because of the tackiness remaining after curing and primarily because of the dielectric property of the polyorganosiloxane. In particular, when non-reactive polyorganosiloxane is added to afford a flexible silicone elastomer without lowering the workability, such polyorganosiloxane that does not participate in crosslinking oozes from inside to the surface and covers the attracted dust. The resulting water-repellent dust is not washed away by rain, thereby damaging the appearance considerably.

The disadvantage of these silicone elastomers in maintaining the building's appearance, which is one of the requirements of a construction material, restricts their utilization. Furthermore, the dust attraction would damage the appearance or utility of industrial materials other than construction materials in many cases. Therefore, development of a technique for preventing the adhesion of dust to the surface of silicone elastomers has been an urgent problem in various fields including the construction industry.

A process for preventing the adhesion of dust to the surface of a silicone elastomer is disclosed in Japanese Patent Laid-Open No. 1627631/1982.

According to this process, the surface of a silicone elastomer is coated with a known coating to which dust is hard to adhere. More particularly, an alkyd resin and a room temperature curable polysiloxane composition, which consists of polydiorganosiloxane end-blocked by silanol groups and having a certain degree of polymerization and a silicon compound having a hydrolyzable group, are dissolved in an organic solvent, and the resulting composition is applied on the surface of a silicone elastomer to thereby form a dustproof film. The resulting film exhibits excellent resistance to dust. However, it has a disadvantage in that so-called cissings and unevenness would occur unless the coating process is carried out in a somewhat viscous state thereby sacrificing its workability.

As a result of investigations about these disadvantages, the present applicant has found that a film forming material prepared by adding an organic solvent containing a volatile organosilicon compound to a composition consisting of an alkyd resin and hydrolyzable silane, siloxane or optionally polydiorganosiloxane end-blocked by silanol groups, exhibits excellent workability, wetting property and adhesion to silicone elastomers at a lower viscosity, and furthermore the resulting film has excellent resistance to dust and weatherability. At first, this film forming material was prepared as a two-package formulation consisting of a principal ingredient and a curing agent which are mixed immediately prior to use. Later, there was prepared a so-called one-package film forming material having a higher workability.

It was found that a composition which can be stored in one-package form for a long time and later form a film which exhibits excellent resistance to dust is obtained by the use of methyltrimethoxysilane as the hydrolyzable silane. However, methyltrimethoxysilane has a rather low boiling point, and boils at a still lower temperature with methanol, which is a hydrolyzate thereof, in the azeotropic form. Therefore, there still remained a problem that excess methyltrimethoxysilane needed to be added to form an excellent film outdoors where air flow is much more frequent because of volatilization of the methyltrimethoxysilane, although the corresponding film forming material forms an excellent film in a closed room.

It is an object of the invention to provide a one-package dustproof film forming material without such disadvantages as described above.

As the result of my research, it was found that a film forming material which provides an excellent film when cured outdoors where air flow is much more frequent than in the case of curing in a closed room, can be prepared by adding an organotin compound as a curing catalyst to a mixture of alkyd resin and methyltrimethoxysilane, adding water to the resulting mixture to thereby induce condensation, and then removing the formed methanol from the reaction product.

SUMMARY OF THE INVENTION

There is provided by the present invention a curable dustproof film forming material comprising
(A) 100 parts by weight of an alkyd resin
(B) 5 to 200 parts by weight of methyltrimethoxysilane
(C) a curing catalyst; and
(D) 50 to 5000 parts by weight of a solvent mixture consisting of
  (a) a volatile organosilicon compound which has a boiling point of 70° to 250° C. at atmospheric pressure and is represented by one of the following formulae:

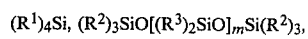

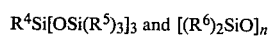

wherein $R^1$ to $R^6$ respectively represent the same or different alkyl groups, m represents O or a positive integer and n represents a positive integer of 3 or above and (b) a hydrocarbon solvent substantially free of methanol, wherein the amount of (a) is 5 to 95 wt % of the total amount of (a) and (b).

DESCRIPTION OF THE INVENTION

The present invention provides a dustproof film forming material which comprises:

a cured material prepared by partial condensation of (A) 100 parts by weight of an alkyd resin (B) 5 to 200 parts by weight of methyltrimethoxysilane (C) a curing catalyst; and (D) 50 to 5000 parts by weight of a solvent mixture consisting of (a) a volatile organosilicon compound which has a boiling point of 70 to 250° C. at atmospheric pressure and has a formula selected from the group consisting of $(R^1)_4Si$, $(R^2)_3SiO[(R^3)_2SiO]_mSi(R^2)_3$, $R^4Si[OSi(R^5)_3]_3$ and $[(R^6)_2SiO]_n$ wherein $R^1$ to $R^6$ present the same or different alkyl groups respectively, m represents O or a positive integer and n represents a positive integer of 3 or more and (b) a hydrocarbon solvent substantially free of methanol wherein the amount of (a) is 5 to 95 wt % of the total amount of (a) and (b).

The component (A) used in the invention is an essential component to prepare a dustproof film forming material, and is formed by esterification or transesterification between a polyhydric alcohol and a polybasic acid, an anhydride or alkyl ester thereof.

As the polyhydric alcohol, any of conventional aliphatic polyhydric alcohols, alicyclic polyhydric alcohols or aliphatic polyhydric alcohols having aromatic rings may be used. Examples thereof are ethylene glycol, diethylene glycol, triethylene glycol, propylene glycol, butanediol-1,4, glycerol, trimethylolpropane, diglycerol, pentaerythritol, sorbitol, cyclohexanediol-1,4, hydrogenated bisphenol A and 2,2-bis(4-hydroxypropoxybenzene). Examples of suitable polybasic acids are succinic acid, adipic acid, azelaic acid, sebacic acid, fumaric acid, maleic acid, itaconic acid, phthalic acid, isophthalic acid, terephthalic acid, trimellitic acid, pyromellitic acid and hexahydrophthalic acid. Examples of suitable polybasic anhydrides are succinic anhydride, maleic anhydride, phthalic anhydride, trimellitic anhydride and pyromellitic anhydride. Examples of suitable alkyl ester are the corresponding methyl esters and ethyl esters.

In order to form reticulate molecules by esterification or transesterification thereby affording a cured film, it is desirable that at least one of these components is a polyhydric alcohol, polybasic acid or derivative thereof having a functionality of 3 or more. Monovalent fatty acids such as lauric acid, palmitic acid, stearic acid, oleic acid, linolic acid, linolenic acid, ricinoleic acid, palm oil fatty acid, safflower oil fatty acid, linseed oil fatty acid, soybean oil fatty acid, rosin acid, dehydrated castor oil fatty acid or the like, or melamine resins may be added as a modifier, if necessary. In order to form a film having excellent dust resistance, which is the object of the invention, it is preferable to use a polybasic acid or derivative thereof which contains at least 50 wt % of phthalic acid, isophthalic acid, phthalic anhydride or methyl esters thereof. Furthermore, it is preferable to use a room temperature curable alkyd resin which has an oil length of at least 45% and is prepared by adding a drying or semi-drying oil as a modifier to a polyhydric alcohol such as glycerol or a combination of glycerol and ethylene glycol.

The component (B) is used in the present invention to form a network siloxane structure upon curing to afford the excellent properties, i.e. water repellency, high-temperature resistance, weatherability and low-temperature resistance, characteristic of silicones to the film and to induce adhesion between said film and the silicone elastomer. The use of methyltrimethoxysilane as component (B) brings about a film forming material which forms a film having better dustproofness as compared with those obtained by using other hydrolyzable silanes or siloxanes and can be stored for a long time in a one-package form.

The component (B) should be used in an amount of 5 to 200 parts by weight per 100 parts by weight of the alkyd resin component (A). When component (B) is used in an amount smaller than 5 parts by weight, the resulting film exhibits poor weatherability, high-temperature resistance, water-repellency etc., as well as a lower adhesion to silicone elastomers. On the other hand, when component (B) is used in an amount larger than 200 parts by weight, the resulting film exhibits a poor anti-fouling property.

The component (C) is used in the present invention to accelerate the condensation of component (B) and any alcoholic hydroxyl groups which remain in the alkyd resin (A), and the partial condensation in the presence of added water to form the coating composition. In addition, it also functions as an accelerator for curing the coating film when it is exposed to the atmosphere. Examples of such a catalyst are carboxylic acid salts of manganese, cobalt, tin, zinc or the like; carboxylic acid disalts of dialkyltin such as dibutyltin diacetate, dibutyltin dioctoate, or dibutyltin dilaurate; and dibutyltin oxide.

The component (D) used in the present invention comprises (a) a volatile organosilicon compound and (b) a hydrocarbon solvent, and is necessary to provide an excellent wetting property and evenness when the film forming material is applied to the surface of silicone elastomers.

The volatile orgnosilicon compound (a) is a silane or siloxane which should not contain any unstable groups, although the presence of hydrogen atoms bonded to the silicon atom is permissible, and exhibits a certain volatility, in other words, has a boiling point of 70° to 250° at atmospheric pressure. If the boiling point is lower than the range specified above, the compound (a) would be dispersed in an early stage of application by volatilization, thereby affording an unsatisfactory result. On the other hand, if the boiling point is above said range, the compound (a) would be hard to dry, thereby slowing down the rate of film formation. Examples of suitable compounds are silanes such as triethylsilane, dimethyldiethylsilane, or trimethylbutylsilane; straight-chain siloxanes such as hexamethyldisiloxane, octamethyltrisiloxane, decamethyltetrasiloxane, or dodecamethylpentasiloxane; branchedchain siloxanes such as 3-trimethylsiloxy-1,1,1,3,5,5,5-heptamethyltrisiloxane; cyclic siloxanes such as hexamethylcyclotrisiloxane, octamethylcyclotetrasiloxane, decamethylcyclopentasiloxane, or 1-ethyl-3,3,5,5,7,7-hexamethylcyclotetrasiloxane. In particular, it is desirable to use methylsiloxanes which can be readily prepared. It is preferable to use oxtamethylcyclotetrasiloxane, which exhibits an appropriate volatility.

Examples of the hydrocarbon solvent (b) are benzene, toluene, xylene, n-hexane, n-heptane, cyclohexane, and gasoline. In particular, it is preferable to use toluene or xylene, which exhibits an appropriate volatility and solubility of the component (A) and is easy to treat.

The component (A) should be blended in an amount of 5 to 95 wt % of the total amount of (a) and (b), and preferably in an amount of 10 to 80 wt %. When the amount of (a) is smaller than 5 wt %, the wetting property of the film forming material to a silicone elastomer would be lowered thereby inducing cissings and unevenness. On the other hand, when the amount of (a) is larger than 95 wt %, the deposited component (A) would make it impossible to obtain a homogeneous composition.

The component (D) should be blended in an amount of 50 to 5000 parts by weight per 100 parts by weight of the component (A). When the amount of (D) is smaller than 50 parts by weight, the high viscosity of the film forming material would lower its workability. On the other hand, when the amount of (D) is larger than 5000 parts by weight, multiple coating is necessary to obtain the desired thickness thereby lowering the workability as well.

Although it is possible to use lower alcohols in addition to hydrocarbon solvents, it is necessary to remove said alcohols in the stage of the production of the film forming material of the invention. It is desirable to remove the lower alcohols as completely as possible.

Examples of such a lower alcohol are straight-chain or branched aliphatic alcohols having 1 to 10 carbon atoms, such as methanol, ethanol, n-propyl alcohol, isopropyl alcohol, sec-butyl alcohol, tert-butyl alcohol, n-amyl alcohol, isoamyl alcohol, sec-amyl alcohol, tert-amyl alcohol, 3-pentanol, n-hexanol, ethylamyl alcohol, and n-heptanol.

By "no methanol or lower alcohol is contained" or "substantially free of methanol" is meant in this specification that these alcohols have been removed from the material to such an extend that can be achieved by an ordinary, simple method.

A process for preparing the film forming material of the invention comprises the following stages. In the first place, to a solution mixture consisting of components (A), (B) and (C) which is prepared, for example, by adding (B) and (C) to a solution of an alkyd resin in a hydrocarbon solvent, 0.25 to 1.5 mol of water is added per mol of the methyltrimethoxxysilane (B) thereby effecting partial condensation. At this stage, it is desirable to use water as a mixture with a lower alcohol such as methanol, ethanol, or isopropyl alcohol in order to improve the dispersibility in the solution mixture. The same hydrocarbon solvents as described above can be used to dissolve the alkyd resin.

When water is added in an amount smaller than 0.25 mol per mol of the methyltrimethoxysilane, excess methyltrimethoxysilane is present in the monomer form in the film forming material. The methyltrimethoxysilane has a rather lower boiling point (i.e. 102° C.) and boils at a still lower temperature (i.e. 47.5° C.) with methanol, which is the hydrolyzate thereof, in the azeotropic form, so that it is liable to disperse by volatilization during drying after application. As outer walls of buildings where such film forming materials are mainly used are exposed to ample quantities of air streams, a considerable amount of methyltrimethoxysilane is lost by dispersion, thereby lowering the weatherability and water repellency of the film and losing the adhesion to silicone elastomers. On the other hand, when water is added in an amount of larger than 1.5 mol, the viscosity would increase during preparation to thereby make it hard to afford a homogeneous composition.

In addition, it is advantageous for affording a homogeneous, glossy film forming material to complete the reaction between alcoholic hydroxyl groups remaining in the alkyd resin and methyltrimethoxysilane by heating the solution mixture of (A), (B) and (C) to the reflux temperature of the solvent, methyltrimethoxysilane or a mixture thereof in the azeotropic form, prior to the partial condensation by the addition of water.

The condensation is usually carried out at 50° to 150° C., and preferably at 60 ° to 120° C. The reaction time is usually 0.5 to 9 hours, and preferably 1 to 3 hours.

Then the methanol, which is a lower alcohol obtained as a reaction product, is removed simultaneously with or after the condensation. It may be removed by any conventional method such as distillation, extraction, or adsorption. However, distillation is the most desirable method for convenience. Distillation is carried out under reduced or atmospheric pressure, with the distillation temperature set to a point which is higher than the boiling point of methanol under the distillation pressure. When a lower alcohol is used as a solvent for water for the partial condensation, it is desirable to distill it with methanol. Because the presence of methanol, which is the reaction product, or other lower alcohols which are used as a solvent for water in the film forming material would bring about cissings when said material is applied on the surface of a silicone elastomer so that it is impossible to form the desired homogeneous film. In such a case, the distilling point is set to a temperature which is higher than the highest boiling point of corresponding lower alcohols.

Finally, a volatile organosilicon compound (D) is added in the necessary amount as described above, thereby completing the preparation. If necessary, the viscosity may be adjusted by adding a hydrocarbon solvent at this stage. Examples of the hydrocarbon solvent are the same ones as described above. When a lower alcohol is used, it is necessary to distill it off again.

Alternately, it is possible to prepare the film forming material of the present invention by adding component (D) to the mixture obtained from the above condensation, then removing the lower alcohol. The same removal methods and distillation conditions as described above may also be applied in this case.

The film forming material of the present invention can be stored in one-package form for a long time and affords a dry surface by rapid curing when applied, thereby forming a homogeneous film which exhibits excellent dustproofness and weatherability. Therefore, the film forming material of the present invention is particularly suitable as a top coating for a silicone elastomer coating material which is applied on the outer walls of buildings where it is important to maintain an appropriate appearance.

The invention will be more clearly understood with reference to the following examples, wherein all parts are expressed by weight.

FORMULATION 1

To 200 parts of a 50% toluene solution of an alkyd resin which had been prepared from a raw material consisting of phthalic anhydride, pentaerythritol and linseed oil fatty acid in a weight ratio of 25:30:45, 0.1 part of zinc octanoate and 100 parts of titanium oxide were added and dispersed by using a ball mill. The result composition was termed "A-1".

FORMULATION 2

To 200 parts of a 50% toluene solution of an alkyd resin which had been prepared from a raw material consisting of terephthalic acid, glycerol and linolic acid in a weight ratio of 35:25:40, 0.1 part of cobalt naphthenate and 100 parts of titanium oxide were added and dispersed by using a ball mill. The resulting composition was termed "A-2".

FORMULATION 3

To 200 parts of a 50% toluene solution of an alkyd resin which had been prepared from a raw material consisting of isophthalic acid, glycerol and linseed oil fatty acid in a weight ratio of 30:25:45, 0.1 part of tin naphthenate and 100 parts of titanium oxide were added and dispersed by using a ball mill. The resulting composition was termed "A-3".

REFERENTIAL EXAMPLE 1

100 parts of polydimethylsiloxane blocked with silanol groups at both terminals and having a viscosity of 20,000 cst at 25° C., 10 parts of fumed silica which had been surface treated with octamethylcyclotetrasiloxane, 10 parts of titanium oxide and 100 parts of ground limestone were mixed in a kneading machine, thereby forming a base compound. Then 0.25 part of dibutyltin dilaurate and 4 parts of methyltris(butanone oxime)silane were added to said base compound successively and mixed under moisture-shielding conditions. 100 parts of kerosene were added to the mixture and mixed, followed by application with a brush on a mild steel sheet. After being cured for 7 days at room temperature, the thickness of the silicone elastomer layer turned out to be approximately 0.4 mm. The resulting steel sheet coated with the silicone elastomer was termed "Test Plate-1".

REFERENTIAL EXAMPLE 2

100 parts of polydimethylsiloxane blocked with silanol groups at both terminals and having a viscosity of 5,000 cst at 25° C., 65 parts of ground limestone and 10 parts of titanium oxide were mixed to form a base compound. Then 3.0 parts of a crosslinking agent mixture consisting of 93 wt % of

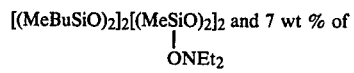

and 7 wt % of

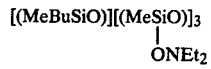

was added to said base compound. Further, 100 parts of xylene was added to liquify the mixture, followed by application with a brush on the surface of a glass plate to form a coating of approximately 0.5 mm in thickness. Then it was cured for 7 days at room temperature. The resulting glass plate coated with the silicone elastomer was termed "Test Plate-2".

EXAMPLE 1

300 parts of "A-1", methyltrimethoxysilane and dibutyltin dilaurate in amounts (parts) as specified in Table 1 were homogeneously mixed in a flask. Then a mixture of water and methanol in amounts (parts) as specified in Table 1 was added thereto and the mixture was stirred for 30 mins. at room temperature and, subsequently for 30 mins. at reflux temperature using a reflux condenser. The temperature of the solution during reflux was 69° C. Then the solution was cooled to a temperature which was lower than the reflux temperature, and methanol was distilled off after replacing the condenser by a distillation tube. At this stage, the temperature of gas in the flask showed a steep rise. When it reached 80° C., the heating was ceased to thereby complete the distillation. Then the solution was cooled to room temperature. The volatile siloxanes as shown in Table 1 were added to the solution to afford samples Nos. 11 to 15.

The resulting samples were applied on the surface of "Test Plate-1" and their wetting properties were observed. Then the time required until they became dry to the touch was measured while blasting with a blower thereby adjusting air stream on the surface of samples to approximately 2 m/sec at room temperature. After blasting for 24 hours, the blasting was ceased and the samples were cured for 5 days at the same temperature. After the completion of the curing, adhesion of the film forming materials to the silicone elastomer was measured by a tensile test with test plates as known to those skilled in the art. The results are shown in Table 1.

Test plates in the same form as described above were exposed to outdoors to determine the degree of contamination in Munsell value. The results are also shown in Table 1, wherein Sample No. 16 is a Comparative Example which was prepared without partial condensation of methyltrimethoxysilane, Sample No. 18 is a Comparative Example which contained no methyltrimethoxysilane and Sample No. 17 is a Comparative Example which contained no volatile organosilicon compound. In addition, a "Test Plate-1" which was coated with no sample was exposed at the same time as a control.

TABLE 1

| Component (part) | 11 | 12 | 13 | 14 | 15 | 16 (Comparative Example) | 17 (Comparative Example) | 18 (Comparative Example) | No-coating (Com. Exam.) |
|---|---|---|---|---|---|---|---|---|---|
| Methyltrimethoxysilane | 15 | 30 | 50 | 30 | 30 | 30 | 30 | — | — |
| Dibutyltin dilaurate | 0.5 | 0.5 | 0.5 | 0.5 | 0.5 | 0.5 | 0.5 | — | — |
| 1:9 mixture of water and methanol | 15 | 30 | 50 | 30 | 30 | — | 30 | — | — |

TABLE 1-continued

| Component (part) | | 11 | 12 | 13 | 14 | 15 | 16 (Comparative Example) | 17 (Comparative Example) | 18 (Comparative Example) | No-coating (Com. Exam.) |
|---|---|---|---|---|---|---|---|---|---|---|
| $[(CH_3)_2SiO]_4$ | | 100 | 100 | 100 | — | — | 100 | — | 100 | — |
| $(CH_3)_3SiOSi(CH_3)_3$ | | — | — | — | 100 | — | — | — | — | — |
| $(CH_3)_3SiOSi(CH_3)_2OSi(CH_3)_3$ | | — | — | — | — | 100 | — | — | — | — |
| Xylene | | — | — | — | — | — | — | 75 | — | — |
| Wetting property | | good | good | good | good | good | good | many cissings | good | — |
| Adhesion of sample film to silicone elastomer | Adhesive strength kgf/cm$^2$ | 10.4 | 10.5 | 9.9 | 10.6 | 10.2 | 1.7 | — | liable to release | — |
| | Failure | cohesive failure of silicone elastomer | Same as the left | Same as the left | Same as the left | Same as the left | release of sample film from silicone elastomer | — | release of sample film from silicone elastomer | — |
| Contamination (Munsell value) | Before exposure outdoors | 9.5 | 9.5 | 9.5 | 9.5 | 9.5 | — | — | — | 9.5 |
| | 6 months after exposure outdoors | 9.0 | 9.0 | 9.0 | 9.0 | 9.0 | — | — | — | 6.0 |
| | 12 months after exposure outdoors | 9.0 | 9.0 | 9.0 | 9.0 | 9.0 | — | — | — | 4.5 |

EXAMPLE 2

300 parts of "A-1", methyltrimethoxysilane and dibutyltin dilaurate in amounts (parts) as specified in Table 1 were homogeneously mixed in a flask. Then water in amounts (parts) as specified in Table 2 was added at a rate of one drop per second to the stirred solution while maintaining the temperature of the solution at 40° to 45° C. by using a reflux condenser. After completion of the addition of water, the stirring was continued for an additional 1 hour at the same temperature and then for 30 mins. with heating. Then the solution was cooled to a temperature which was lower than the reflux temperature, and methanol was distilled off after replacing the reflux condenser by a distillation tube. At this stage, the temperature of gas in the flask showed a steep rise. When it reached 80° C., the heating was ceased to thereby complete the distillation. Then the solution was cooled to room temperature, and the same weight of xylene as that of the removed methanol and the volatile siloxanes as shown in Table 2 was added to thereby afford the samples Nos. 21 to 25. The resulting samples were subjected to a tensile test in the same manner as described in Example 1. The results are shown in Table 2, wherein Sample No. 26 is a Comparative Example which was prepared without the removal of methanol by distillation nor the addition of xylene in the same weight as that of removed methanol.

TABLE 2

| Component (part) | 21 | 22 | 23 | 24 | 25 | 26 (Comparative Example) |
|---|---|---|---|---|---|---|
| Methyltrimethoxysilane | 15 | 30 | 50 | 30 | 30 | 30 |
| Dibutyltin dilaurate | 0.5 | 0.5 | 0.5 | 0.5 | 0.5 | 0.5 |
| Water | 1.5 | 3 | 5 | 3 | 3 | 3 |
| $[(CH_3)_2SiO]_4$ | 100 | 100 | 100 | — | — | 100 |
| $(CH_3)_3SiOSi(CH_3)_3$ | — | — | — | 100 | — | — |
| $(CH_3)_3SiOSi(CH_3)_2OSi(CH_3)_3$ | — | — | — | — | 100 | — |
| Wetting property | good | good | good | good | good | uneven |
| Adhesion of sample film to silicone elastomer — Adhesive strength kgf/cm$^2$ | 11.1 | 10.5 | 10.7 | 11.0 | 11.2 | — |
| Failure | cohesive failure of silicone elastomer | cohesive failure of silicone elastomer | cohesive failure of silicone elastomer | cohesive failure of silicone elastomer | cohesive failure of silicone elastomer | — |
| Contamination (Munsell value) — Before exposure outdoors | 9.5 | 9.5 | 9.5 | 9.5 | 9.5 | — |
| 6 months after exposure outdoors | 9.0 | 9.0 | 9.0 | 9.0 | 9.0 | — |
| 12 months after exposure outdoors | 9.0 | 9.0 | 9.0 | 9.0 | 9.0 | — |

EXAMPLE 3

300 parts of "A-2" was used as a phthalic acid resin solution to thereby afford the Samples Nos. 31 to 38 as shown in Table 3. These samples were subjected to a tensile test in the same manner as described in Example 1, using "Test Plate-2" as a silicone elastomer coated test panel. The results are shown in Table 3, wherein Sample No. 36 is a Comparative Example which was prepared without the partial condensation of methyltrimethoxysilane, Sample No. 38 is a Comparative Example which contained no methyltrimethoxysilane, and Sample No. 37 is a Comparative Example which contained no volatile organosilicon compound. In addition, a "Test Panel-2" which was coated with no sample was exposed at the same time as a control.

TABLE 3

| Component (part) | Sample No. 31 | 32 | 33 | 34 | 35 | 36 (Comparative Example) | 37 (Com. Example) | 38 (Comparative Example) | No-coating (Com. Example) |
|---|---|---|---|---|---|---|---|---|---|
| Methyltrimethoxysilane | 30 | 30 | 30 | 30 | 30 | 30 | 30 | — | — |
| Dibutyltin dilaurate | 0.5 | 0.5 | 0.5 | 0.5 | 0.5 | 0.5 | 0.5 | — | — |
| 1:9 mixture of water and methanol | 20 | 30 | 40 | 30 | 30 | — | 30 | — | — |
| $[(CH_3)_2SiO]_4$ | 80 | 100 | 120 | — | — | 100 | — | 100 | — |
| $(CH_3)_3SiOSi(CH_3)_3$ | — | — | — | 100 | — | — | — | — | — |
| $(CH_3)_3SiOSi(CH_3)_2OSi(CH_3)_3$ | — | — | — | — | 100 | — | — | — | — |
| Xylene | — | — | — | — | — | — | 75 | — | — |
| Wetting property | good | good | good | good | good | good | many cissings | good | — |
| Adhesion of sample film to silicone elastomer — Adhesive strength kgf/cm² | 12.0 | 12.9 | 11.6 | 12.0 | 12.3 | 1.2 | — | liable to release | — |
| Adhesion of sample film to silicone elastomer — Failure | cohesive failure of silicone elastomer | Same as the left | Same as the left | Same as the left | Same as the left | release of sample film from silicone elastomer | — | release of sample film from silicone elastomer | — |
| Contamination (Munsell value) Before exposure outdoors | 9.5 | 9.5 | 9.5 | 9.5 | 9.5 | — | — | — | 9.5 |
| 6 months after exposure outdoors | 9.0 | 9.0 | 9.0 | 9.0 | 9.0 | — | — | — | 4.5 |
| 12 months after exposure outdoors | 9.0 | 9.0 | 9.0 | 9.0 | 9.0 | — | — | — | 4.0 |

EXAMPLE 4

300 parts of "A-3" was mixed with methyltrimethoxysilane in amounts (parts) as specified in Table 4, and the mixture was stirred for 1 hour at the reflux temperature of the methyltrimethoxysilane. Then the solution was cooled to room temperature, treated in the same manner as described in Example 2 and subjected to a tensile test in the same manner as described in Example 1. The results are shown in Table 4 , wherein Sample No. 46 is a Comparative Example which was prepared without the removal of methanol by distillation nor the addition of xylene in the same weight as that of removed methanol.

TABLE 4

| Component (part) | Sample No. 41 | 42 | 43 | 44 | 45 | 46 (Comparative Example) |
|---|---|---|---|---|---|---|
| Methyltrimethoxysilane | 30 | 30 | 30 | 30 | 30 | 30 |
| Dibutyltin dilaurate | 0.5 | 0.5 | 0.5 | 0.5 | 0.5 | 0.5 |
| Water | 2 | 3 | 4 | 3 | 3 | 3 |
| $[(CH_3)_2SiO]_4$ | 80 | 100 | 120 | — | — | 100 |
| $(CH_3)_3SiOSi(CH_3)_3$ | — | — | — | 100 | — | — |
| $(CH_3)_3SiOSi(CH_3)_2OSi(CH_3)_3$ | — | — | — | — | 100 | — |
| Wetting property | good | good | good | good | good | uneven |
| Adhesion of sample film to silicone elastomer — Adhesive strength kgf/cm² | 12.7 | 12.6 | 11.8 | 11.8 | 12.4 | — |
| Adhesion of sample film to silicone elastomer — Failure | cohesive failure of silicone elastomer | cohesive failure of silicone elastomer | cohesive failure of silicone elastomer | cohesive failure of silicone elastomer | cohesive failure of silicone elastomer | — |
| Contamination (Munsell value) Before exposure outdoors | 9.5 | 9.5 | 9.5 | 9.5 | 9.5 | — |
| 6 months after exposure outdoors | 9.0 | 9.0 | 9.0 | 9.0 | 9.0 | — |
| 12 months after exposure outdoors | 9.0 | 9.0 | 9.0 | 9.0 | 9.0 | — |

EXAMPLE 5

Samples Nos. 12, 22, 32 and 42 were introduced into a glass bottle, sealed immediately after preparation, and left in a thermostat at 50° C. After being left for 1 month, the samples were taken out of the thermostat and cooled to room temperature. Then they were subjected to a tensile test in the same manner as described in Example 1. The results are shown in Table 5.

TABLE 5

| Sample No. | 12 | 22 | 32 | 42 |
|---|---|---|---|---|
| Wetting property | good | good | good | good |
| Adhesion of sample film to silicone elastomer — Adhesive strength kg f/cm² | 11.5 | 10.5 | 10.9 | 10.4 |
| Adhesion of sample film to silicone elastomer — Failure | cohesive failure of silicone elastomer | 10.5 | 10.9 | 10.4 |
| Contamination. (Munsell value) Before exposure outdoors | 9.5 | 9.5 | 9.5 | 9.5 |
| 5 months after exposure outdoors | 9.0 | 9.0 | 9.0 | 9.0 |
| 11 months after exposure outdoors | 9.0 | 9.0 | 9.0 | 9.0 |

I claim:

1. A composition curable to a dustproof coating material comprising:

(A) 100 parts by weight of an alkyd resin, (B) 5 to 200 parts by weight of methyltrimethoxysilane,
(C) a curing catalyst; and
(D) 50 to 5000 parts by weight of a solvent mixture consisting of
   (a) a volatile organosilicon compound which has a boiling point of 70° to 250° C. at atmospheric pressure and has a formula selected from the group consisting of $(R^1)_4Si$, $(R^2)_3SiO[(R^3)_2SiO]_mSi(R^2)_3$, $R^4Si[OSi(R^5)_3]_3$ and $[(R^6)_2SiO]_n$ wherein $R^1$ to $R^6$ respectively represent the same or different alkyl groups, m represents O or a positive integer and n represents a positive integer of 3 or above and (b) a hydrocarbon solvent substantially free of methanol wherein the amount of (a) is 5 to 95 wt % of the total amount of (a) and (b).

2. A composition as set forth in claim 1 wherein said alkyd resin (A) is a room temperature curable alkyd resin.

3. A composition as set forth in claim 1 wherein at least 50 wt % of polybasic acids or their derivatives which comprise said alkyd resin (A) are phthalic compounds selected from the group consisting of phthalic acid, isophthalic acid, alkyl esters of phthalic acid, alkyl esters of isophthalic acid and phthalic anhydride.

4. A composition as set forth in claim 1 wherein $R^2$ to $R^6$ of compound (D)(a) are methyl groups.

5. A composition as set forth in claim 1 wherein said curing catalyst (C) is selected from the group consisting of carboxylic acid salts of manganese, cobalt, tin, and zinc and carboxylic acid disalts of dialkyl tin.

* * * * *